(12) United States Patent
Weast et al.

(10) Patent No.: US 11,134,340 B2
(45) Date of Patent: Sep. 28, 2021

(54) AUTHENTICATION THROUGH TISSUE-CONDUCTED SOUND

(71) Applicant: Intel Corporation, Santa Clara, CA (US)

(72) Inventors: John C. Weast, Portland, OR (US); Glen J. Anderson, Beaverton, OR (US); Giuseppe Raffa, Portland, OR (US); Daniel S. Lake, Hillsboro, OR (US); Kathy Yuen, Portland, OR (US); Lenitra M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1005 days.

(21) Appl. No.: 14/546,010

(22) Filed: Nov. 18, 2014

(65) Prior Publication Data

US 2016/0142816 A1 May 19, 2016

(51) Int. Cl.
*H04R 1/46* (2006.01)
*G06Q 20/40* (2012.01)
*H04R 25/00* (2006.01)
*H04R 29/00* (2006.01)

(52) U.S. Cl.
CPC ......... *H04R 1/46* (2013.01); *G06Q 20/40145* (2013.01); *H04R 25/606* (2013.01); *H04R 29/00* (2013.01); *H04R 2225/67* (2013.01); *H04R 2460/13* (2013.01)

(58) Field of Classification Search
CPC .......... H04R 1/14; H04R 1/46; H04R 25/606; H04R 29/00; H04R 2225/67; H04R 2420/07; H04R 2460/13; H04R 2499/11; G06F 3/012; G06F 21/32; G06Q 20/401; G06Q 20/40145; G07C 2009/00809; G07C 9/37
USPC ....... 381/301, 326, 327, 151, 376, 380, 381; 345/7, 8
See application file for complete search history.

(56) References Cited

U.S. PATENT DOCUMENTS

| | | | |
|---|---|---|---|
| 8,963,806 B1 * | 2/2015 | Starner | G02B 27/0093 345/7 |
| 9,112,701 B2 * | 8/2015 | Sano | H04L 9/32 |
| 2011/0301729 A1 * | 12/2011 | Heiman | H04S 7/301 700/94 |

OTHER PUBLICATIONS

Cory Cornelius et al., Vocal resonance as a passive biometric, Dartmouth Computer Science Technical Report TR2014-747, pp. 1-12, Dartmouth College—Institute for Security, Technology, and Society, Hanover, NH, USA.

Satoru Tsuge et al., Speaker verification method using bone-conduction and air-conduction speech, 2009 International Symposium on Intelligent Signal Processing and Communication Systems, Dec. 7-9, 2009, pp. 449-452, IEEE, Japan.

* cited by examiner

*Primary Examiner* — Huyen D Le
(74) *Attorney, Agent, or Firm* — Jordan IP Law, LLC

(57) ABSTRACT

Systems and methods may provide for sending a sound wave signal and measuring a body conduction characteristic of the sound wave signal. Additionally, a user authentication may be performed based at least in part on the body conduction characteristic. In one example, the body conduction characteristic includes one or more of a timing, a frequency or an amplitude of the sound wave signal after passing through one or more of bone or tissue.

25 Claims, 5 Drawing Sheets

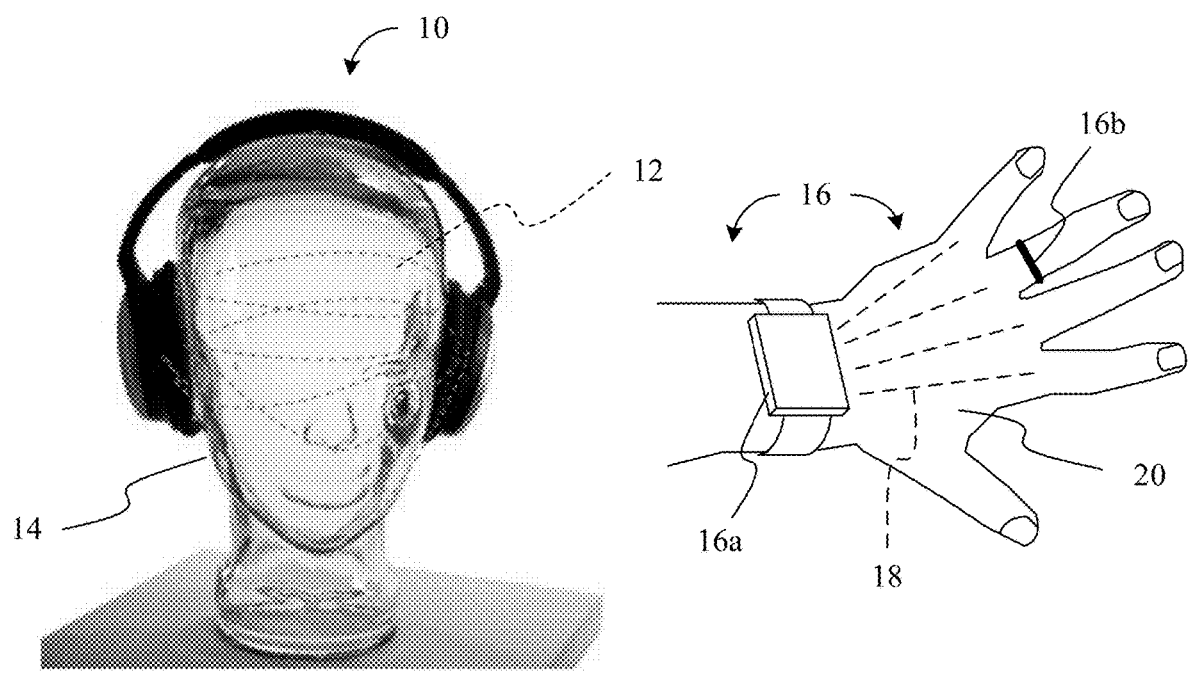
FIG. 1A  FIG. 1B
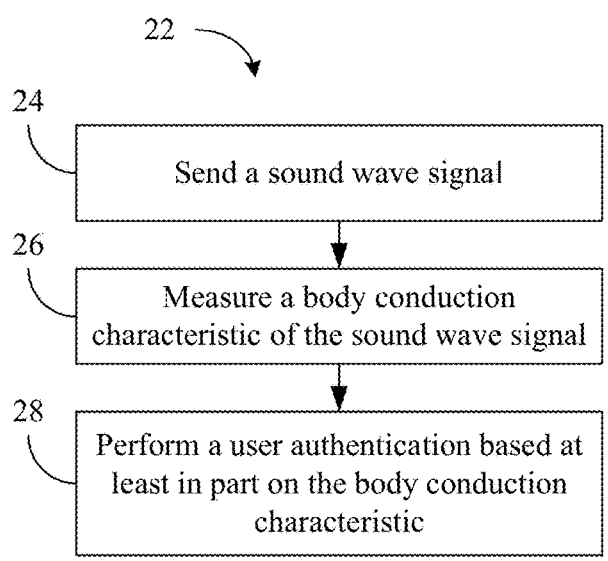
FIG. 2

AUTHENTICATION THROUGH TISSUE-CONDUCTED SOUND

TECHNICAL FIELD

Embodiments generally relate to user authentication. More particularly, embodiments relate to user authentication through tissue-conducted sound.

BACKGROUND

Authentication may be used to grant or deny user access to various systems such as, for example, electronic commerce (e-commerce) systems, consumer devices, online accounts, and so forth. While traditional authentication approaches may have involved user entry of login and/or PIN (personal identification) information, more recent solutions may evaluate biometric information such as fingerprint, retina and/or voice scans submitted by the user. Each of these approaches may involve active participation on the part of the user (e.g., PIN entry, fingerprint swipe, voice prompt responses). Accordingly, conventional solutions may be inconvenient and/or bothersome to the user. Moreover, these solutions may be unsuitable in situations when user awareness of the authentication process is not desired and/or the user is not awake/unconscious.

BRIEF DESCRIPTION OF THE DRAWINGS

The various advantages of the embodiments will become apparent to one skilled in the art by reading the following specification and appended claims, and by referencing the following drawings, in which:

FIGS. 1A and 1B are illustrations of examples of form factors for user-based systems according to embodiments;

FIG. 2 is a flowchart of an example of a method of authenticating users according to an embodiment;

DESCRIPTION OF EMBODIMENTS

Figures 3A, 3B:
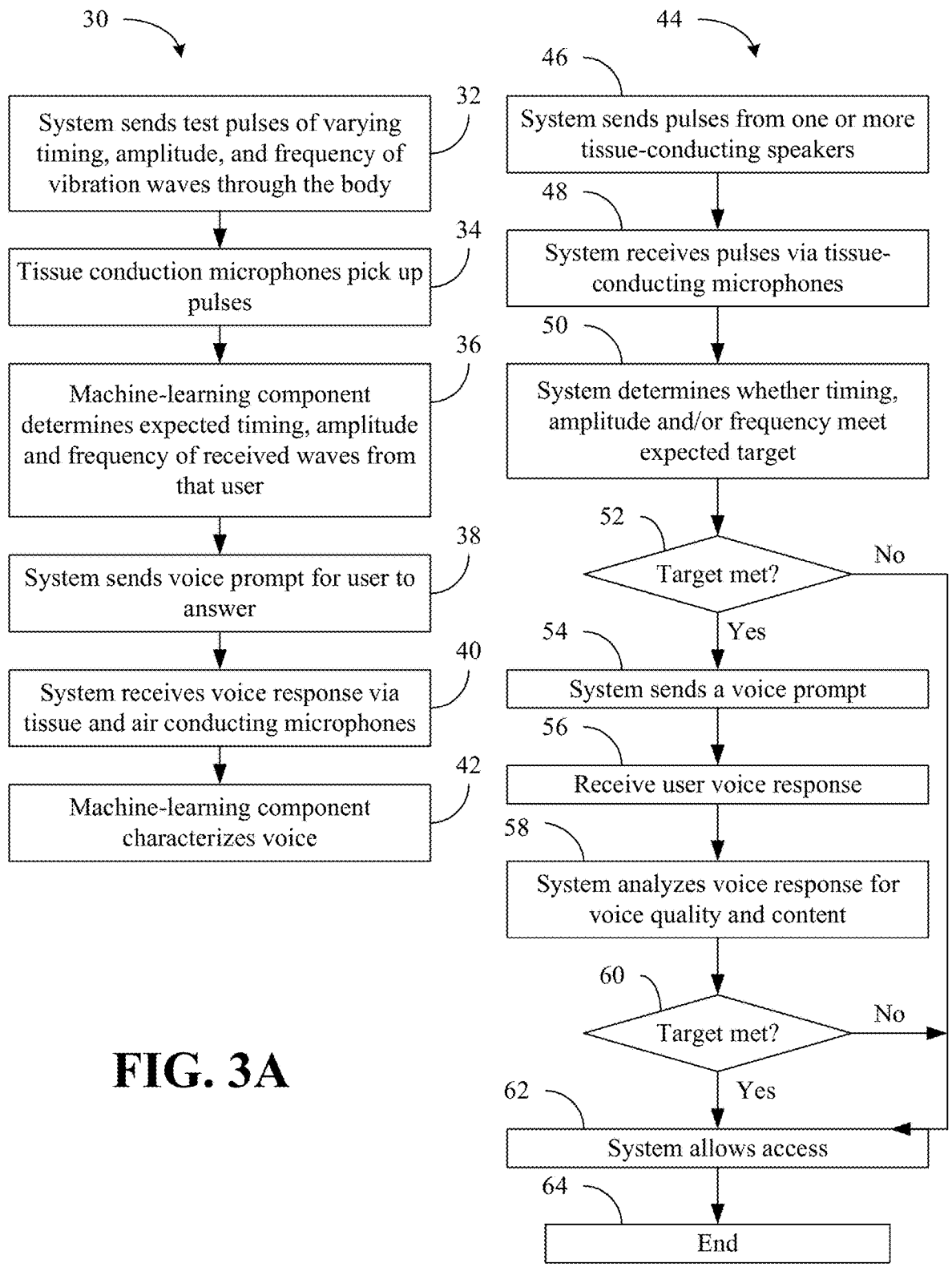
FIGS. 3A and 3B are flowcharts of examples of methods of training and operating, respectively, an authenticating apparatus according to an embodiment.

Turning now to FIG. 1A, a user-based system 10 is shown in which user authentication is performed through tissue-conducted sound. In the illustrated example, the system 10 generally has a substantially single-part enclosure with a headset form factor and one or more tissue conduction speakers (e.g., in contact with the skin, not shown) that produce sound wave signals 12. Alternatively, air speakers may be used to generate the sound wave signals 12, although tissue conduction speakers may be more efficient, depending on the circumstances. The sound wave signals 12 may propagate through the bone and/or tissue in the head of a wearer 14 of the system 10, wherein the propagated sound wave signals 12 may be captured by one or more sensors (e.g., tissue conduction microphones) and analyzed to detect and/or identify the wearer 14. For example, body conduction characteristics such as, for example, the timing, frequency and/or amplitude of the propagated sound wave signals 12 after passing though bone and/or tissue may be analyzed as part of the user authentication process.

The sound wave signals 12 may be configured based on (e.g., tailored to) an expected user (e.g., in accordance with a previous training process and/or user preference/profile) and may be transmitted as pulses or other suitable waveform. For example, it may be determined that some waveforms are more effective than others for a particular user (e.g., based on the size of the person). Moreover, certain users may have preferred wearable device configurations that may be taken into consideration when tailoring the sound wave signals 12 to the expected user. Additionally, the sound wave signals 12 may be either audible or inaudible from the perspective of the wearer 14. Configuring the sound wave signals 12 as inaudible/imperceptible signals may enable the user authentication to be conducted without the awareness of the wearer 14. In one example, the signals 12 are incorporated into music or other pre-existing audio signal being output to the wearer 14. As will be discussed in greater detail, the illustrated approach may be used in conjunction with additional authentication factors such as, for example, voice input, gesture input or textual input.

Other headwear form factors such as, for example, glasses, hats, headbands, etc., may be used for the system 10 depending on the circumstances. Moreover, other non-wearable or wearable form factors such as, for example, wrist wear form factors, hand wear form factors, may be used for the system 10. For example, FIG. 1B shows a user-based system 16 (16a, 16b) that includes a multi-part enclosure having a first portion 16a with a wrist wear (e.g., watch, bracelet) form factor and a second portion 16b with a hand wear (e.g., ring) form factor. In the illustrated example, the first portion 16a includes one or more tissue conduction speakers that produce sound wave signals 18, wherein the sound wave signals 18 propagate through the bone and/or tissue in the hand 20 of a wearer. The propagated sound wave signals 18 may be captured by one or more sensors (e.g., tissue conduction microphones, accelerometers) and analyzed (e.g., based on timing, frequency, amplitude) to detect and/or identify the wearer.

For example, the amplitude of a sound wave may vary by the mass of the tissue through which it traverses. Accordingly, that variance may be used to discriminate across wearers. Other variations of characteristics across bodies, such as, for example, shape and density of tissue may also affect how sound waves conduct through tissue. For example, some tissues of certain thickness and density may conduct high frequency sound waves better than others. Additionally, wearer identity may be a function of how certain patterns of sound waves (e.g., pulse configuration) propagate through tissue. In another example, the second portion 16b might have the form factor of a smart phone, tablet computer or other handheld device containing one or more accelerometers capable of detecting the vibrations of the hand 20 while grasping/squeezing the second portion 16b. Variations on placement of the second portion 16b include, but are not limited to, ankle bracelets, shoes and other items worn on the limbs of a user.

Turning now to FIG. 2, a method 22 of authenticating users is shown. The method 22 may be implemented as a module or related component in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 22 may be written in any combination of one or more programming languages, including an object oriented programming language such as Java, Smalltalk, C++ or the like and conventional procedural programming languages, such as the "C" programming language or similar programming languages.

Illustrated processing block 24 provides for sending a sound wave signal via, for example, a tissue conduction speaker in contact with the skin of a user. One or more body conduction characteristics of the sound wave signal may be measured at block 26. The body conduction characteristics may include, for example, timing (e.g., propagation delay), frequency (e.g., center frequency, harmonics), amplitude (e.g., attenuation), and so forth, relative to bone (e.g., cranium, phalanges), tissue (e.g., connective/cartilage, muscle, nervous, epithelial), etc., or any combination thereof. Illustrated block 28 performs a user authentication based at least in part on the body conduction characteristic(s). As already noted, performing the user authentication may include detecting a user, identifying the user, and so forth. Moreover, the user authentication may be performed further based on an additional authentication factor including voice input, gesture input, textual input, etc., or any combination thereof. In one example, block 28 includes capturing, via one or more of a tissue conduction microphone or an accelerometer, a measurement signal associated with the sound wave signal and comparing the measurement signal to a previously acquired training signal.

FIG. 3A shows a method 30 of training an authentication apparatus. The method 30 may be implemented as a module or related component in a set of logic instructions stored in a machine- or computer-readable storage medium such as RAM ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

In the illustrated example, the user puts on a system containing the authentication system and the system sends one or more test pulses, wherein block 32 provides for sending test pulses of varying timing, amplitude, and frequency of vibration waves through the body of the user. One or more tissue conduction microphones may pick up (e.g., sense, measure) the pulses propagating through the body at block 34. Block 36 may determine (e.g., via a machine-learning component) an expected timing, amplitude and frequency of received waves from the user in question. Optionally, a voice prompt may be sent to the user at block 38, wherein a voice response may be received at block 40. The voice response may be received via tissue conducting and/or air conducting microphones. Illustrated block 42 characterizes the voice of the user based on the voice response. Other authentication factors such as, for example, gesture input and/or textual input may also be used to train the authentication apparatus.

FIG. 3B shows a method 44 of training an authentication apparatus. The method 44 may be implemented as a module or related component in a set of logic instructions stored in a machine- or computer-readable storage medium such as RAM ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

In the illustrated example, a user action initiates an authentication request, wherein block 46 provides for sending pulses from one or more tissue conducting speakers. The pulses may be received via one or more tissue conducting microphones at block 48 and a determination may be made at block 50 as to whether the timing, amplitude and/or frequency of the received pulses meets an expected target (e.g., for a particular user). If it is determined at block 52 that the expected target is met, illustrated block 54 sends a voice prompt to the user. A user response to the voice prompt may be received at block 56, wherein illustrated block 58 provides for analyzing the voice response in terms of voice quality and content. If it is determined at block 60 that an expected target is met, access (e.g., to an e-commerce system, consumer device, online account, etc.) may be granted at block 62. If either the sound wave pulses or the voice prompt do not meet the expected target, access may be denied and the method 44 may terminate at block 64.

Thus, the illustrated approach may use tissue conduction as a passive precursor to other higher level authentication techniques involving active user participation. As a result, power efficiency may be improved. Additionally, the tissue conduction pulses may be sent periodically, wherein only if the passive tissue conduction authentication fails for a specific period of time, would more explicit voice-based authentication be used. The periodicity of the passive tissue conduction authentication may also be changed dynamically based on the user, device and/or environmental context.

Figure 4:
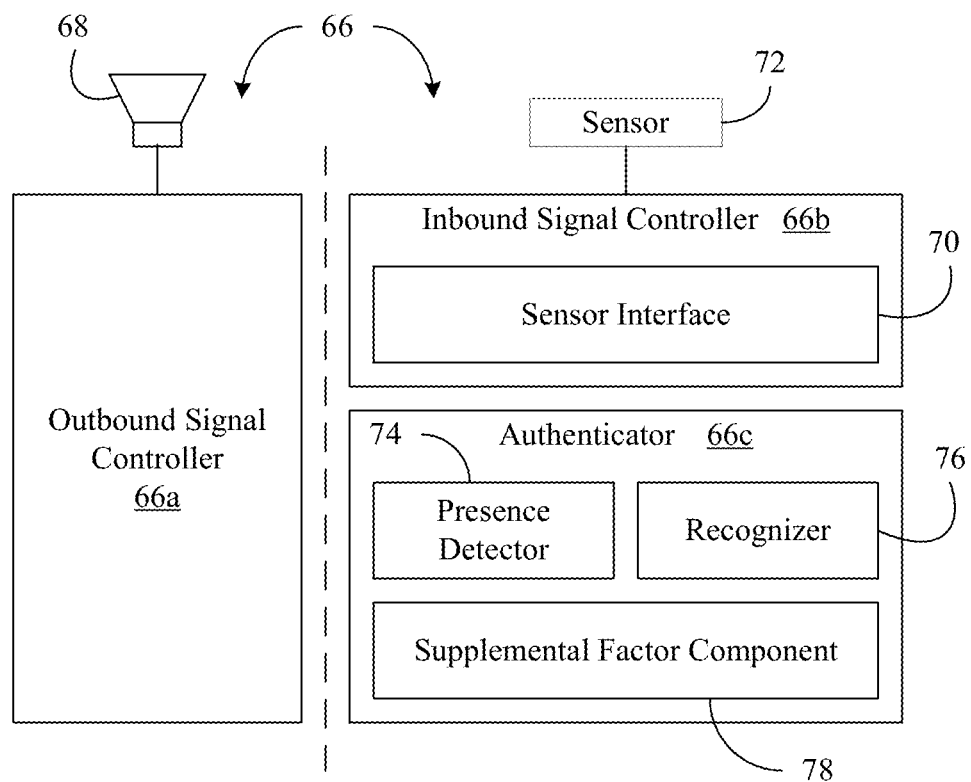
FIG. 4 is a block diagram of an example of an authentication apparatus according to an embodiment.

Turning now to FIG. 4 an authentication apparatus 66 (66a-66c) is shown. The apparatus 66 may generally implement one or more aspects of the method 22 (FIG. 2), the method 30 (FIG. 3A) and/or the method 44 (3B), already discussed. In the illustrated example, an outbound signal controller 66a configures a sound wave signal based on an expected user and sends the sound wave signal via a speaker 68, wherein an inbound signal controller 66b measures a body conduction characteristic of the sound wave signal. For example, the inbound signal controller 66b may include a sensor interface 70 to capture, via a sensor 72 (e.g., air microphone, tissue conduction microphone, accelerometer), a measurement signal associated with the sound wave signal and compare the measurement signal to a training signal. The body conduction characteristic may include a timing, frequency and/or amplitude of the sound wave signal after passing through one or more of bone or tissue.

The illustrated authentication apparatus 66 also includes an authenticator 66c to perform a user authentication based at least in part on the body conduction characteristic. In one example, the authenticator 66c includes a presence detector 74 to detect a user (e.g., distinguish between the presence or absence of a user) and a recognizer 76 to identify the user (e.g., distinguish between a particular user and other users). The illustrated authenticator 66c also includes a supplemental factor component 78 to perform the user authentication further based on an additional authentication factor including one or more of voice input, gesture input or textual input.

For example, in the case of a wrist-worn system, the user might be prompted to make a particular hand gesture (e.g., motion hand upward, to the left, to the right, etc.) that may be monitored via one or more accelerometers or other suitable sensors. Indeed, the supplemental factor component 78 may provide for multiple authentication factors to supplement tissue conduction. Thus, one supplemental factor may be a hand gesture that is input via a smart phone and another supplemental factor may be a foot gesture that is input via a shoe-worn device, wherein a positive result from all three factors (e.g., tissue conduction, hand gesture, foot gesture) might be required before access is granted.

Additionally, the authentication apparatus 66 may be contained within the same platform (e.g., single-part enclosure) as in case of the user-based system 10 (FIG. 1A) or distributed across multiple platforms (e.g., multi-part enclosure) as in the case of the user-based system 16 (FIG. 1B). Moreover, the platforms may collaborate (e.g., using a body area network (BAN) to determine the most appropriate set of devices to participate in the authentication.

Figure 5:
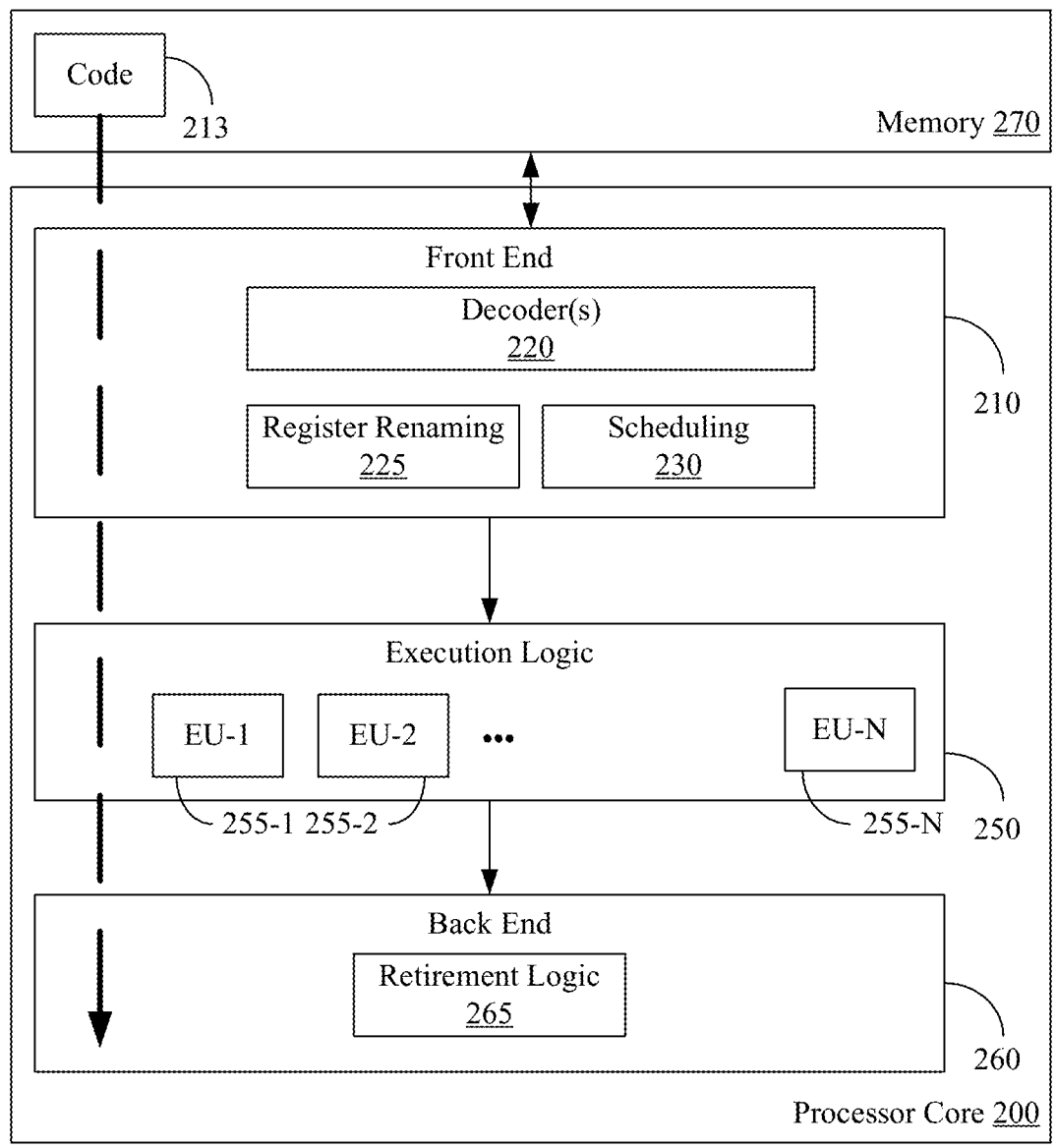
FIG. 5 is a block diagram of an example of a processor according to an embodiment.

FIG. 5 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 5, a processing element may alternatively include more than one of the processor core 200 illustrated in FIG. 5. The processor core 200 may be a single-threaded core or, for at least one embodiment, the processor core 200 may be multithreaded in that it may include more than one hardware thread context (or "logical processor") per core.

FIG. 5 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the beacon blocks or the observation blocks of the method 22 (FIG. 2), the method 30 (FIG. 3A) and/or the method 44 (FIG. 3B), already discussed. In one example, the memory 270 is non-flash memory. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 5, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 6:
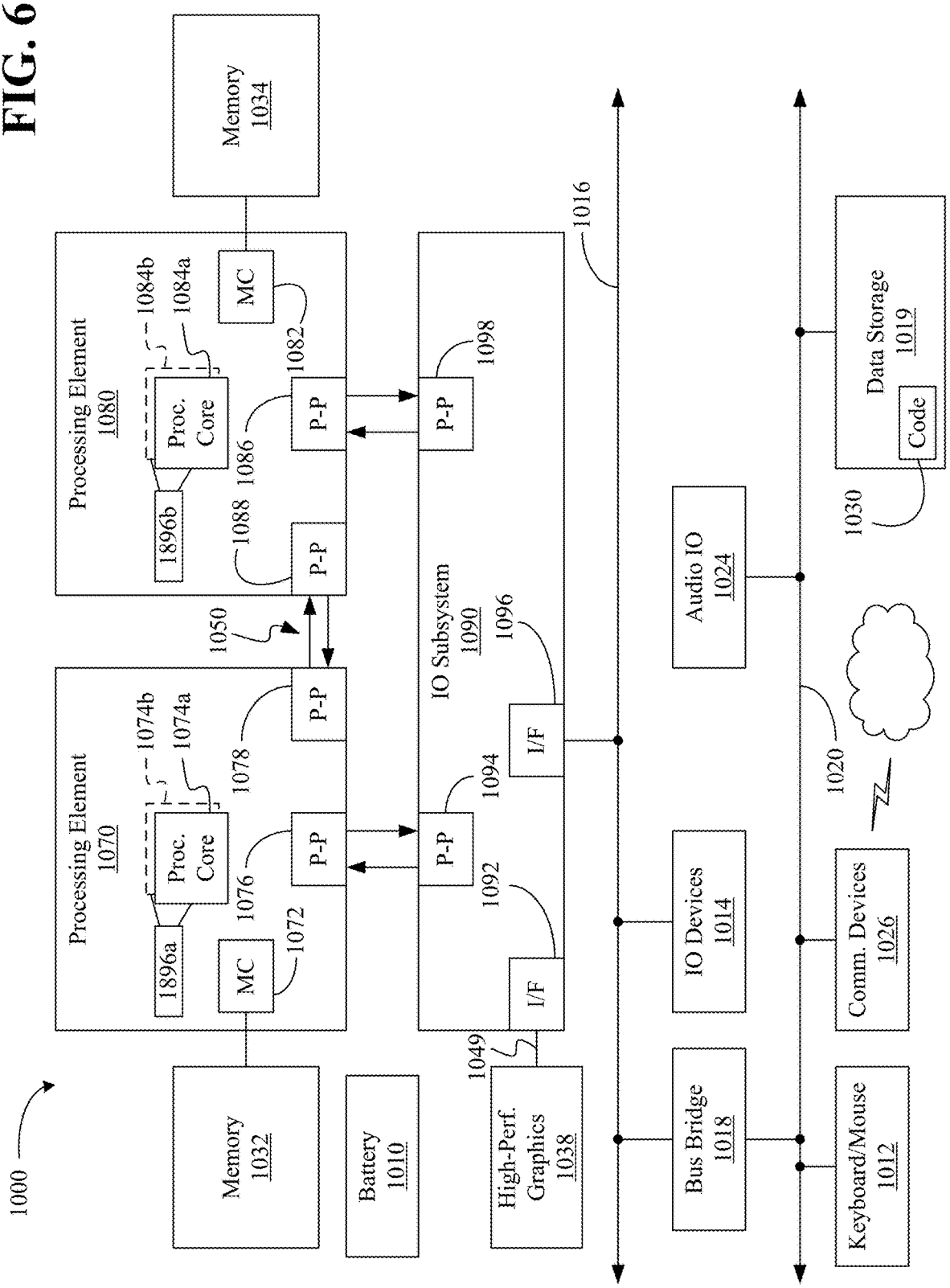
FIG. 6 is a block diagram of an example of a computing system according to an embodiment.

Referring now to FIG. 6, shown is a block diagram of a computing system 1000 embodiment in accordance with an embodiment. Shown in FIG. 6 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 6 may be implemented as a multi-drop bus rather than point-to-point interconnect.

As shown in FIG. 6, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 5.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 6, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 6, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 6, various I/O devices 1014 (e.g., speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the beacon blocks or the observation blocks of the method 22 (FIG. 2), the method 30 (FIG. 3A) and/or the method 44 (FIG. 3B), already discussed, and may be similar to the code 213 (FIG. 5), already discussed. Further, an audio I/O 1024 may be coupled to second bus 1020 and a battery 1010 may supply power to the computing system 1000.

Note that other embodiments are contemplated. For example, instead of the point-to-point architecture of FIG. 6, a system may implement a multi-drop bus or another such communication topology. Also, the elements of FIG. 6 may alternatively be partitioned using more or fewer integrated chips than shown in FIG. 6.

ADDITIONAL NOTES AND EXAMPLES

Example 1 may include a user-based system comprising an enclosure including a wearable form factor, a tissue conduction speaker, a sensor including one or more of a tissue conduction microphone or an accelerometer, an outbound signal controller to send, via the tissue conduction speaker, a sound wave signal, an inbound signal controller coupled to the sensor, the inbound signal controller to measure a body conduction characteristic of the sound wave signal, and an authenticator to perform a user authentication based at least in part on the body conduction characteristic.

Example 2 may include the system of Example 1, wherein the body conduction characteristic is to include one or more of a timing, a frequency or an amplitude of the sound wave signal after passing through one or more of bone or tissue.

Example 3 may include the system of Example 1, wherein the authenticator further includes one or more of a presence detector to detect a user; or a recognizer to identify the user.

Example 4 may include the system of Example 1, further including a supplemental factor component to perform the user authentication further based on an additional authentication factor including one or more of voice input, gesture input or textual input.

Example 5 may include the system of Example 1, wherein the inbound signal controller includes a sensor interface to capture, via the sensor, a measurement signal associated with the sound wave signal and compare the measurement signal to a training signal.

Example 6 may include the system of any one of Examples 1 to 5, wherein the outbound signal controller is to configure the sound wave signal based on an expected user.

Example 7 may include the system of any one of Examples 1 to 5, wherein the enclosure includes one of a single-part enclosure or a multi-part enclosure and wherein the wearable form factor includes one or more of a headwear form factor, a wrist wear form factor or a hand wear form factor.

Example 8 may include an authentication apparatus comprising an outbound signal controller to send a sound wave signal, an inbound signal controller to measure a body conduction characteristic of the sound wave signal, and an authenticator to perform a user authentication based at least in part on the body conduction characteristic.

Example 9 may include the apparatus of Example 8, wherein the body conduction characteristic is to include one or more of a timing, a frequency or an amplitude of the sound wave signal after passing through one or more of bone or tissue.

Example 10 may include the apparatus of Example 8, wherein the authenticator further includes one or more of a presence detector to detect a user; or a recognizer to identify the user.

Example 11 may include the apparatus of Example 8, further including a supplemental factor component to perform the user authentication further based on an additional authentication factor including one or more of voice input, gesture input or textual input.

Example 12 may include the apparatus of Example 8, wherein the inbound signal controller includes a sensor interface to capture, via one or more of a tissue conduction microphone or an accelerometer, a measurement signal associated with the sound wave signal and compare the measurement signal to a training signal, and wherein outbound signal controller is to send the sound wave signal via a tissue conduction speaker.

Example 13 may include the apparatus of any one of Examples 8 to 12, wherein the outbound signal controller is to configure the sound wave signal based on an expected user.

Example 14 may include a method of operating an authenticating apparatus, comprising sending a sound wave signal, measuring a body conduction characteristic of the sound wave signal, and performing a user authentication based at least in part on the body conduction characteristic.

Example 15 may include the method of Example 14, wherein the body conduction characteristic includes one or more of a timing, a frequency or an amplitude of the sound wave signal after passing through one or more of bone or tissue.

Example 16 may include the method of Example 14, wherein performing the user authentication includes one or more of detecting a user or identifying the user.

Example 17 may include the method of Example 14, wherein the user authentication is performed further based on an additional authentication factor including one or more of voice input, gesture input or textual input.

Example 18 may include the method of Example 14, further including capturing, via one or more of a tissue conduction microphone or an accelerometer, a measurement signal associated with the sound wave signal; and comparing the measurement signal to a training signal, wherein the sound wave signal is sent via a tissue conduction speaker.

Example 19 may include the method of any one of Examples 14 to 18, further including configuring the sound wave signal based on an expected user.

Example 20 may include at least one computer readable storage medium comprising a set of instructions which, when executed by a computing device, cause the computing device to send a sound wave signal, measure a body conduction characteristic of the sound wave signal, and perform a user authentication based at least in part on the body conduction characteristic.

Example 21 may include the at least one computer readable storage medium of Example 20, wherein the body conduction characteristic is to include one or more of a timing, a frequency or an amplitude of the sound wave signal after passing through one or more of bone or tissue.

Example 22 may include the at least one computer readable storage medium of Example 20, wherein the instructions, when executed, cause a computing device to one or more of detect a user to perform the user authentication; or identify the user to perform the user authentication.

Example 23 may include the at least one computer readable storage medium of Example 20, wherein the user authentication is to be performed further based on an additional authentication factor including one or more of voice input, gesture input or textual input.

Example 24 may include the at least one computer readable storage medium of Example 20, wherein the instructions, when executed, cause a computing device to capture, via one or more of a tissue conduction microphone or an accelerometer, a measurement signal associated with the sound wave signal; and compare the measurement signal to a training signal, wherein the sound wave signal is to be sent via a tissue conduction speaker.

Example 25 may include the at least one computer readable storage medium of any one of Examples 20 to 24, wherein the instructions, when executed, cause a computing device to configure the sound wave signal based on an expected user.

Example 26 may include an authentication apparatus comprising means for performing the method of any of Examples 14 to 19, in any combination or sub-combination thereof.

Thus, techniques described herein may provide a convenient, low power solution to user authentication. Additionally, techniques may be more secure due to the difficulty of observing and/or duplicating body conduction characteristics by unauthorized individuals. The techniques may be suitable in situations when user awareness of the authentication process is not desired (e.g., background/stealth authentication) and/or the user is not awake/unconscious (e.g., in public health scenarios).

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:
1. A system comprising:
an enclosure including a wearable form factor;
a tissue conduction speaker;
a sensor including one or more of a tissue conduction microphone or an accelerometer;

an outbound signal controller to send, via the tissue conduction speaker, a sound wave signal;
an inbound signal controller coupled to the sensor, the inbound signal controller to measure a body conduction characteristic of the sound wave signal; and
an authenticator to perform a passive user authentication based at least in part on the body conduction characteristic, wherein the authenticator enables the passive user authentication to be performed prior to an additional user authentication based on an additional factor.

2. The system of claim 1, wherein the bone conduction characteristic is to include one or more of a timing, a frequency or an amplitude of the sound wave signal after passing through one or more of bone or tissue.

3. The system of claim 1, wherein the authenticator further includes one or more of:
a presence detector to detect a user; or
a recognizer to identify the user.

4. The system of claim 1, further including a supplemental factor component to perform the user authentication further based on an additional authentication factor including one or more of voice input, gesture input or textual input.

5. The system of claim 1, wherein the inbound signal controller includes a sensor interface to capture, via the sensor, a measurement signal associated with the sound wave signal and compare the measurement signal to a training signal.

6. The system of claim 1, wherein the outbound signal controller is to configure the sound wave signal based on an expected user.

7. The system of claim 1, wherein the enclosure includes one of a single-part enclosure or a multi-part enclosure and wherein the wearable form factor includes one or more of a headwear form factor, a wrist wear form factor or a hand wear form factor.

8. An apparatus comprising:
an outbound signal controller to send a sound wave signal;
an inbound signal controller to measure a body conduction characteristic of the sound wave signal; and
an authenticator to perform a passive user authentication based at least in part on the body conduction characteristic, wherein the authenticator enables the passive user authentication to be performed prior to an additional user authentication based on an additional factor.

9. The apparatus of claim 8, wherein the bone conduction characteristic is to include one or more of a timing, a frequency or an amplitude of the sound wave signal after passing through one or more of bone or tissue.

10. The apparatus of claim 8, wherein the authenticator further includes one or more of:
a presence detector to detect a user; or
a recognizer to identify the user.

11. The apparatus of claim 8, further including a supplemental factor component to perform the user authentication further based on an additional authentication factor including one or more of voice input, gesture input or textual input.

12. The apparatus of claim 8, wherein the inbound signal controller includes a sensor interface to capture, via one or more of a tissue conduction microphone or an accelerometer, a measurement signal associated with the sound wave signal and compare the measurement signal to a training signal, and wherein outbound signal controller is to send the sound wave signal via a tissue conduction speaker.

13. The apparatus of claim 8, wherein the outbound signal controller is to configure the sound wave signal based on an expected user.

14. A method comprising:
sending a sound wave signal;
measuring a body conduction characteristic of the sound wave signal; and
performing a passive user authentication based at least in part on the body conduction characteristic, wherein the passive user authentication is performed prior to an additional user authentication based on an additional factor.

15. The method of claim 14, wherein the bone conduction characteristic includes one or more of a timing, a frequency or an amplitude of the sound wave signal after passing through one or more of bone or tissue.

16. The method of claim 14, wherein performing the user authentication includes one or more of detecting a user or identifying the user.

17. The method of claim 14, wherein the user authentication is performed further based on an additional authentication factor including one or more of voice input, gesture input or textual input.

18. The method of claim 14, further including:
capturing, via one or more of a tissue conduction microphone or an accelerometer, a measurement signal associated with the sound wave signal; and
comparing the measurement signal to a training signal, wherein the sound wave signal is sent via a tissue conduction speaker.

19. The method of claim 14, further including configuring the sound wave signal based on an expected user.

20. At least one non-transitory computer readable storage medium comprising a set of instructions which, when executed by a computing device, cause the computing device to:
send a sound wave signal;
measure a body conduction characteristic of the sound wave signal; and
perform a passive user authentication based at least in part on the body conduction characteristic, wherein the passive user authentication is performed prior to a user authentication based on an additional factor.

21. The at least one non-transitory computer readable storage medium of claim 20, wherein the body conduction characteristic is to include one or more of a timing, a frequency or an amplitude of the sound wave signal after passing through one or more of bone or tissue.

22. The at least one non-transitory computer readable storage medium of claim 20, wherein the instructions, when executed, cause a computing device to one or more of:
detect a user to perform the user authentication; or
identify the user to perform the user authentication.

23. The at least one non-transitory computer readable storage medium of claim 20, wherein the user authentication is to be performed further based on an additional authentication factor including one or more of voice input, gesture input or textual input.

24. The at least one non-transitory computer readable storage medium of claim 20, wherein the instructions, when executed, cause a computing device to:
capture, via one or more of a tissue conduction microphone or an accelerometer, a measurement signal associated with the sound wave signal; and
compare the measurement signal to a training signal, wherein the sound wave signal is to be sent via a tissue conduction speaker.

25. The at least one non-transitory computer readable storage medium of claim 20, wherein the instructions, when executed, cause a computing device to configure the sound wave signal based on an expected user.

* * * * *